Figures 1, 2:
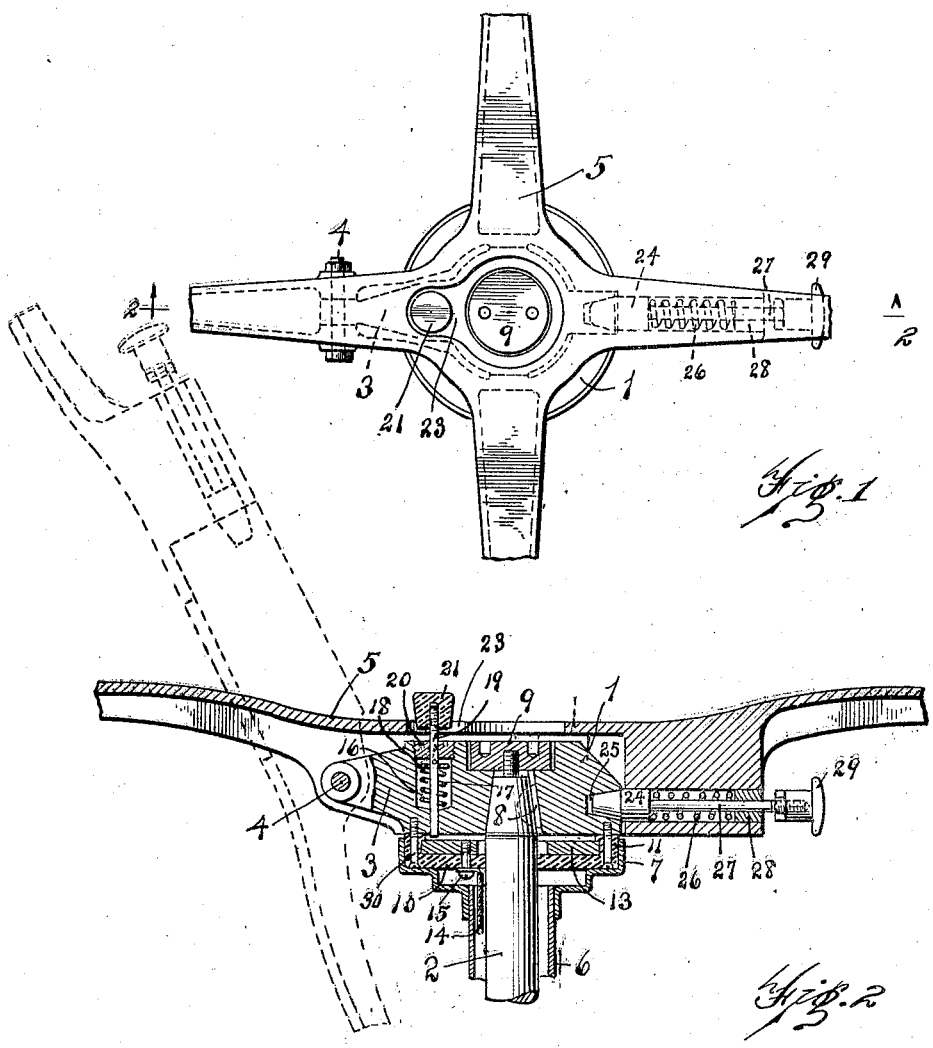

Feb. 23, 1926.

E. H. VINCENT 1,574,320

STEERING WHEEL

Filed Nov. 5, 1923

Inventor

Edward H. Vincent

By Edward N. Pagelsen,
Attorney

Patented Feb. 23, 1926.

UNITED STATES PATENT OFFICE.

EDWARD H. VINCENT, OF DETROIT, MICHIGAN.

STEERING WHEEL.

Application filed November 5, 1923. Serial No. 672,880.

*To all whom it may concern:*

Be it known that I, EDWARD H. VINCENT, a citizen of the United States, and residing at Detroit, in the county of Wayne and State of Michigan, have invented a new and Improved Steering Wheel, of which the following is a specification.

This invention relates to steering wheels for automobiles, particularly to the general type illustrated in my prior Patent No. 1,459,040, dated June 19, 1923, which embodies a wheel head portion, and a rim and spider portion pivoted to the head portion, and its object is to provide a steering wheel of this character which shall be of great strength, which shall be simple in construction, and wherein the horn button and a slidable contact member attached thereto shall be carried by the wheel head while a movable spider is provided with an opening to give access to this button.

This invention consists in a steering shaft of any desired character and a wheel head mounted thereon, a wheel spider mounted on the head, and a pair of normally disengaged electrical contact members, at least one of which is mounted in the wheel head.

It further consists in also mounting the second contact member on the wheel head and insulating it therefrom.

It also consists of the details of construction illustrated in the accompanying drawing and particularly pointed out in the claims.

In the drawing, Fig. 1 is a plan and Fig. 2 is a central vertical section on the line 2—2 of Fig. 1, of a steering wheel embodying the present invention.

Similar reference characters refer to like parts throughout the several views.

As this invention is confined to electric contacts for the horn circuit of an automobile, the connection between the wheel head or hub 1 and the steering shaft 2 is shown in its simplest form. The head has an arm 3 carrying a pin 4 on which the spider 5 is pivoted. The rim of this wheel is omitted but may be supplied by those skilled in the art. I have shown a standard or tube 6 through which the shaft 2 extends and at its upper end is a cylindrical guard flange 7.

The head may be attached to the shaft by means of a key 8 and a nut 9. Attached to the lower side of the head and extending into the guard flange 7 is a disk 10 of insulating material having a flange 11, integral therewith if desired. A metal ring 13 and a conductor wire 14 may be attached to each other and to this disk by means of a screw 15.

Mounted in a small bore 16 in the arm 3 of the head 1 and offset from the axis of the shaft 2 is a spring 17 which presses up against a collar 18 on the slidable contact stem 19 which is guided in proper holes in the arm 3 and in the bushing 20 which closes the upper end of this bore. A knob or horn button 21 may be attached to the upper end of this stem 19 so that the stem may be pressed down to engage the ring 13. Where a two-wire system is employed, another conductor wire may attach to the shaft 2 or to the head 1, but in a single-wire system this is not necessary.

The spider 5 is formed with an aperture 23 which permits free operation of the horn button and may be made sufficiently large to give access to the nut 9 while the spider is in operative position. The spider may be held in this position by a bolt 24 which is forced into a tapering recess 25 in the head 1 by means of a spring 26. A stem 27 extends from this bolt through a guide opening in the bushing 28 to the knob 29.

It will be noticed that the spider covers the head or hub 1 and that the opening 23 is of sufficient size to give such clearance around the button 21 that the spider may be swung on the pin 4 between operative and inoperative positions without affecting or engaging this button. I prefer to have this opening and the button above the wheel head offset from the shaft as shown in the drawing, but this may be changed by those skilled in the art as may be desired. Thus the contact may be placed adjacent the bottom of the wheel hub and at an angle to the axis of the shaft, when the opening in the spider would be in the form of a notch in the side wall of the central portion of the spider.

The horn button and the slidable contact connected thereto may be operated irrespective of the position of the spider on the head, the opening in the spider permitting this when the spider is in operative position and in partially tilted position. When the spider is tilted back to the position shown in dotted lines in Fig. 2, the button is entirely accessible.

It will be further noted that the disk 13 is carried by the wheel head and rotates therewith. If the screws 30 were omitted, the ring 13 could be held stationary within the guard flange 7 and be independent of the wheel. Contact would be made with the stem 19 in the same manner as before.

The details of construction and proportions of the parts may all be changed without departing from the spirit of my invention as set forth in the following claims.

I claim:—

1. In combination, a steering shaft, a wheel head mounted thereon and having an opening parallel to and offset from the axis of said shaft, normally disengaged electrical contact elements, one of said elements being movable through the opening in the head, the other contact element being stationary below and carried by the head and engageable by the movable element, and means above the head and connected to the movable element to operate the same.

2. In combination, a steering shaft, a wheel head mounted thereon and comprising an arm, and normally disengaged electrical contact elements, one of said contact elements being slidably mounted in and carried by said arm and adapted to be moved to engage the other contact element which is normally stationary and carried by said wheel head.

3. In combination, a steering shaft, a wheel head mounted thereon, electrical contact elements, one of said contact elements being movably mounted in and carried by said wheel head and adapted to be manually moved to engage the other contact element which is carried by an insulated member attached to said wheel head, and resilient means mounted in said wheel head to hold the contact elements out of engagement.

4. In combination, a rotatable steering shaft, a wheel head mounted thereon and adapted for rotation with said shaft, normally disengaged electrical contact elements, one of said contact elements consisting of a movable stem and an operating member carried by said wheel head and offset from the axis of said shaft, the other contact consisting of a metal ring and an insulating ring, both rings encompassing said shaft and carried by said wheel head, said stem adapted to be manually moved to engage said contact ring.

5. In combination, a rotatable steering shaft, a wheel head mounted thereon, a movable electrical contact carried by said wheel head, and an electrical contact rigidly secured to said wheel head, said contacts adapted to have electrical engagement.

6. In combination, a rotatable steering shaft, a wheel hub mounted thereon and comprising an arm, a wheel spider adapted to be moved to operative or inoperative positions on the wheel hub and having a portion adapted to cover the hub and the arm, an opening in the spider portion which covers said hub and said arm, an electrical contact carried by said arm and extending into said spider opening when said spider is in operative position on the hub, the opening in said spider providing clearance with respect to said contact so that said spider may be moved from operative to inoperative position on the hub, and a second electrical contact removably attached to but insulated from said wheel hub and adapted to engage but normally out of engagement with the first.

7. In combination, a rotatable steering shaft, a wheel hub mounted thereon and comprising an arm, a wheel spider adapted to cover said hub and said arm, an opening in the portion of the spider which covers said arm, a movable electrical contact carried by the arm and extending into said opening in the spider, and a second electrical contact carried at the lower surface of said wheel hub and adapted to engage the first but normally held out of engagement therewith.

8. In combination, a steering shaft, a wheel head mounted thereon and comprising an arm integral therewith, movable contact means mounted in said arm, stationary contact means insulated from said wheel head, and resilient means mounted in said arm and adapted to hold said movable contact means out of engagement with said stationary contact means.

9. In combination, a shaft casing, a steering shaft, a wheel head mounted thereon and removable therefrom in one direction, movable contact means carried by said wheel head, and normally stationary contact means carried by and removable from said wheel head, said first and second mentioned contact means normally disengaged but adapted to have relative engagement, the removal of said stationary contact means from said wheel head being prevented in one direction by said shaft casing and in the other direction by said wheel head until the latter is removed from said shaft.

10. In combination, a steering shaft, a wheel head comprising an arm, a movable contact member and a spring carried by said arm, and stationary electrical contact means below said head and carried thereby, said movable contact member adapted to be moved to engage said stationary contact means, said spring adapted to hold said movable contact member out of engagement with said stationary contact means.

11. In combination, a steering shaft, a wheel head removably mounted thereon, and electrical contact means removably carried by and below said head whereby said contact means and said head may be unitedly mounted on or dismounted from said shaft without requiring removal of said electrical contact means from said wheel head.

12. In combination, a shaft casing, a steering shaft, a wheel head mounted thereon, electrical contact means adjacent the lower portion of said head, electrical conducting means attached to said contact means, and a protective case resting upon said shaft casing independently of said wheel head, for said contact means and said conducting means.

13. In combination, a steering shaft, a wheel head mounted thereon and removable therefrom in one direction, electrical contact means adjacent the lower portion of said wheel head, one or more electrical conductors attached to said contact means, and a removable protective cover for said contact means and carried independently of said wheel head and encompassing said contact means and said conductor or conductors, the removal of said protective cover in the direction in which the wheel head is removable being prevented by the latter until it is removed from said shaft.

14. In combination, a rotatable steering shaft, a wheel head mounted on and adapted to rotate said shaft and having a longitudinal opening parallel to and offset from the axis of said shaft, a contact ring encompassing said shaft adjacent the lower portion of and carried by said head, a member slidable through said longitudinal opening in said wheel head and adapted to engage said contact ring, and resilient means mounted in said longitudinal opening in the wheel head to normally hold said slidable member from engagement with said contact ring.

EDWARD H. VINCENT.